No. 860,305. PATENTED JULY 16, 1907.
D. R. KNAPP & H. E. CADE.
ELECTRIC CURRENT REGULATOR.
APPLICATION FILED NOV. 24, 1905.
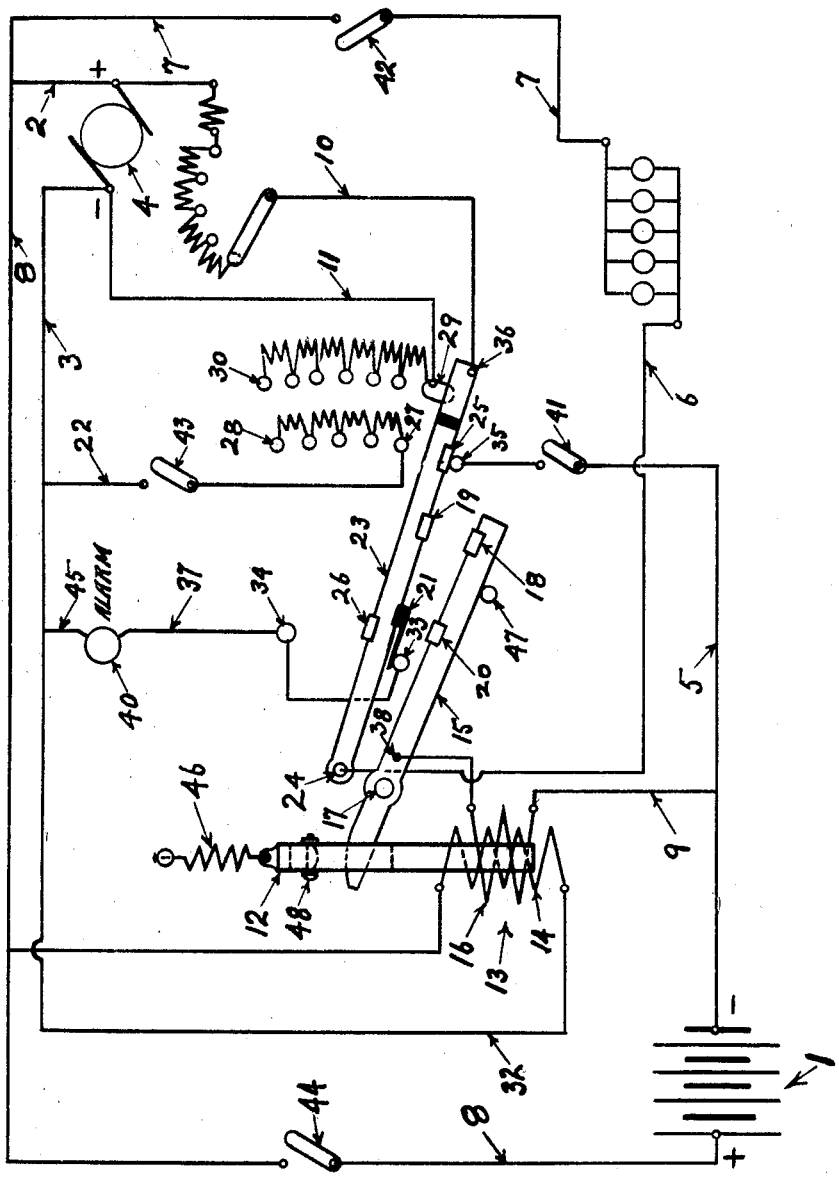
WITNESSES:
Jas. Nelson Alexander.
Paul P. Banholzer.
INVENTORS:
David R. Knapp
Howard E. Cade
by their Attorney
Rob. D. Kinney

UNITED STATES PATENT OFFICE.

DAVID R. KNAPP, OF PHILADELPHIA, AND HOWARD E. CADE, OF PENCOYD, PENNSYLVANIA.

ELECTRIC-CURRENT REGULATOR

No. 860,305. Specification of Letters Patent. Patented July 16, 1907.

Application filed November 24, 1906. Serial No. 288,959.

*To all whom it may concern:*

Be it known that we, DAVID R. KNAPP and HOWARD E. CADE, citizens of the United States, residing, respectively, at Philadelphia, in the county of Philadelphia, and at Pencoyd, in the county of Montgomery, both in the State of Pennsylvania, have invented certain new and useful Improvements in Electric-Current Regulators, of which the following is a specification.

This invention relates to electro-mechanical contrivances employed for storage battery charging and discharging current and voltage control wherein automatic regulation is desirable without loss of efficiency in its operation; and the object of our improvements is to provide a method of and automatic electrical operated apparatus for, first, closing the charging circuit on the charging supply circuit whenever the voltage of the charging source is sufficiently high to close the electrical connections and allow a charging current to flow; second, sounding an alarm upon the closing of the charging circuit upon the supply circuit; third, opening the charging circuit from the supply circuit when the voltage of the supply circuit becomes lower than that of the battery being charged; fourth, interposing a variable resistance in the charging circuit whenever the voltage of the charging circuit is such as would otherwise cause an excessive flow of charging current through the charging circuit; fifth, interposing a variable auxiliary resistance in series with the supply circuit generator field winding, and its field rheostat, whenever the voltage of the supply circuit is such as would cause an excessive flow of charging current through the charging circuit, as also through the distribution circuit when it is connected with the supply circuit; sixth, closing the storage battery on the distribution circuit whenever the voltage of the supply circuit employed in charging the battery falls below that of the battery being charged; seventh, closing the supply circuit on the distribution circuit whenever the voltage of the supply circuit employed in charging the battery is sufficient to close the charging circuit and cause a current to flow through same; eighth, sounding an alarm whenever the voltage of the supply circuit is such as to cause an excessive flow of current through the charging circuit, as also through the distribution circuit when it is connected to the supply circuit; ninth, sounding an alarm whenever the battery is wrongly connected to the charging circuit; tenth, sounding an alarm upon breaking of the charging current.

We accomplish said object by the method and apparatus hereinafter described and specifically mentioned in the claims that are hereto appended and form a part hereof.

The nature, characteristic features, and scope of our said invention will be more fully understood from the following description, taken in connection with the accompanying drawings, forming part hereof, and in which Figure 1 is a view diagrammatically illustrating an installation of our said invention.

Referring to the drawings, 1 is the storage battery which it is desired to be charged; 2 is the positive and 3 the negative lead of the supply circuit; 4 is the generator which supplies the charging current, as also the current for feeding the distribution circuit while the battery is being charged; 5, arm 23, 6, 7 and 8 are the leads connecting the battery to the distribution circuit, and 2, 7, 6, arm 23, 22 and 3 are the leads connecting the generator to the distribution circuit during the charging of the battery; 2, 8 9, arms 15 and 23, 22 and 3 are the leads of the charging circuit; 10 and 11 are the leads of an auxiliary shunt generator field rheostat; 12 is a solenoid plunger operated by an electromagnet 13, and reacting spring 46, said magnet consisting of an electro-magnet main winding 14, for energizing same and composed of such a number of turns and resistance properties as will afford a magnetic attraction or pull sufficient to properly move the solenoid plunger a certain distance of its travel against the reacting force of the spring 46, for the purpose of causing the vibrating contact-lever 15, hereinafter more particularly described, to vibrate through the desired degree of angular travel, the resistance of said winding being sufficient to stand its direct connection across the battery charging circuit leads.

The electro-magnet 13 is also provided with an auxiliary electro-magnet winding 16, which forms a part of the lead 9 of the charging circuit, and is so connected that when the charging current is flowing its resulting magneto-motive force supplements that which is caused by the main winding 14, but when a current of opposite direction of flow occurs therein the resulting opposing magnet-motive force to that which is caused by the main winding 14 causes a considerable weakening of the magnetic attraction or pull on the solenoid plunger.

The vibrating contact-lever 15, hereinbefore mentioned, is of suitable length and is supported by a pivoted connection 17, and is actuated by the solenoid plunger through the connection therewith, at its one end as hereinafter more particularly mentioned or described, and intermediate between its pivoted support 17 and its opposite end, it is provided with a contact point 18 located so as to engage with contact point 19, of the rheostat arm 23, hereinafter more particularly described, and with contact point 20 located so as to engage with contact point 21, which is insulated from the rheostat arm 23 for the purpose of enabling the closing of the gong circuit through the leads 37 and 45; and with the terminal connection 38 of the lead 9 of the battery charging circuit; and is inserted in the charging circuit so that its oscillating movements, caused by the magnetic pull on the solenoid plunger, on the one hand, and the opposing force of the spring 46 acting on the other hand, serves to open and close the charging circuit through the leads 9 and 22 in conjunction with contact arm 15 and the rheostat arm 23; and also to close the gong circuit to signal upon the closing or opening of the charging circuit; the gong is indicated by 40; 47 is a post against which the vibrating contact-lever 15 may repose when not in service.

The connection between the solenoid plunger 12 and the vibrating contact lever 15 is such that will admit of more or less travel movement of the solenoid plunger before beginning to actuate the lever 15; we accomplish this by providing the solenoid plunger with a slotted hole in which the end of the lever 15 projects, as shown on the drawing, this slotted hole being provided with an adjustable lever-bearing or stop 48, to enable adjusting the amount of travel movement of the solenoid plunger before it will begin to actuate the lever 15.

The rheostat contact arm 23 is pivoted at 24 and is provided with the usual means for returning it to its normal position when not under the action of the vibrating contact-lever 15; it is also provided with contact points, additional to those previously mentioned as engaging with those of the lever 15, as follows:—with point 25 to engage with point 35 of the battery discharging line, as also with rheostat buttons 27 to 28 in the charging circuit; and with point 26 to engage with point 34 of stop-post 34; and with point 36, which is insulated from the rheostat arm 23, to engage with buttons 29 to 30 of an auxiliary shunt generator-field rheostat for the purpose of controlling the voltage of the generator when it is supplying current for the distribution circuit and battery.

The angular travel of the rheostat arm 23 is limited by stops 34 and 35, of which 34 is provided with a contact point the engaging of which or of point 33 enables the closing of the gong circuit, (so long as points 18 and 19 and 20 and 21 are engaged), through the lead 37 upon their engagement with points 21 or 26, as the case may be; the contact point 21 is insulated from the rheostat contact arm 23 for the purpose of preventing the closing of the gong circuit while the battery is discharging through the distribution circuit, but it is in engagement with contact point 33 so long as the rheostat contact arm is at rest against the post 35, as is the case while the battery is discharging through the distribution circuit.

The foregoing described apparatus is suitably mounted on an appropriate panel, and upon its being properly proportioned and connected throughout, including the switches indicated on the drawing, all of which will be readily understood by those skilled in the art to which this invention relates, its mode of operation will be substantially as follows:—All of the switches being closed, and sufficient voltage being present in the supply circuit, a flow of current corresponding to such voltage will take place in the electro-magnet main winding, causing a corresponding pull to act upon the solenoid plunger, and it in turn will operate the vibrating contact-lever connected to same.

It is obvious that the angular distance of travel of the vibrating contact-lever will be regulated by the intensity of the electro-magnetic pull on the solenoid plunger and its opposing force caused by the spring 46.

As the pull of the electro-magnet on the solenoid plunger varies with the amount of current that is flowing through the magnet windings any change in the voltage of the supply circuit will cause a corresponding change in the amount of current flowing through the electro-magnet winding circuits, and thereby producing upon the solenoid plunger a corresponding change in its movements that will operate the vibrating contact-lever accordingly.

When the voltage present in the supply-circuit is sufficient to cause a flow of current through the battery charging circuit the solenoid plunger will move to that position at which the vibrating contact-lever will just engage the contact points 18 and 19, and also button 27 with rheostat arm 23, thereby closing the battery charging circuit and accomplishing the hereinbefore mentioned first part of the object of our said invention.

The moving of the vibrating contact-lever 15, as just described also operates to engage contact points 20 and 21, thereby closing the gong circuit and cause the gong to sound the signal that indicates the closing of the charging circuit, thereby accomplishing the hereinbefore mentioned second part of the object of our said invention.

The closing of the charging circuit, as just described, also operates to close its engaged contact points more firmly, because of the increased pull on the solenoid plunger following upon the increased magnetic strength of the electro-magnet resulting from the flow of the charging current through the auxiliary windings of the electro-magnet, and the further angular movement of the vibrating contact-lever, thereby closing those contact points more firmly, also operates to slightly further move the rheostat contact arm thereby opening the gong circuit through the resulting disengagement of contact points 21 and 33, whereby the ceasing of the gong sound will indicate that the battery is being charged providing contact points 18 and 19 are found remaining in contact with each other.

In case the voltage of the supply circuit should decrease, during the charging process, below that of the battery being charged, there would be a corresponding decrease in the magnetic strength due to a weakened current augmented by the resulting opposing magnetic force caused by the reversed current flowing through the auxiliary winding of the electro-magnet by reason of the resulting discharge of battery current that would occur upon such decrease of voltage in the supply circuit, and therefore a corresponding decrease would occur in the intensity of the pull on the solenoid plunger, which, being opposed by the force of the reacting spring 46 would then be insufficient to maintain the aforesaid contact made by the engagements of the points 18 and 19, and consequently the charging circuit would thereby be opened and an escape of battery current through the charging connections be prevented; thus accomplishing the hereinbefore mentioned third part of the object of our said invention.

Under normal voltage conditions of charging a battery with our said improved method and apparatus the rheostat contact arm would remain in the hereinbefore mentioned engagement with the first contact button 27.

In case the voltage of the supply circuit would increase beyond the normal conditions the increased resulting flow of current through the electro-magnet windings would increase the pull on the solenoid plunger and cause the vibrating contact-lever to move the rheostat contact arm to such other rheostat contact-buttons as would interpose, in both the charging circuit and the auxiliary shunt generator-field rheostat circuit, resistances necessary for reducing the generator to normal conditions of charging current through the battery; thereby accomplishing the hereinbefore mentioned fourth and fifth parts of the object of our said invention.

It is obvious that when the voltage of the generator falls below that of the battery the resulting decrease in the pull of the electro magnet on the solenoid plunger, caused by the weakening of the electro-magnetic force due to a reverse current flowing through its auxiliary winding from the battery and a reduction of current through the main winding due to the decreased voltage, will allow the force of the reacting spring 46 acting on the solenoid plunger and the attached vibrating contact-lever, to drop back and engage contact points 25 and 35, thus closing the storage battery on the distribution circuit, which thus accomplishes the hereinbefore mentioned sixth part of the object of our said invention.

It is also obvious that when the voltage of the generator is sufficient to close the charging circuit, as hereinbefore described, the movement of the rheostat contact arm will engage with the button 27 and thereby close the supply circuit on the distribution circuit; and thereby accomplish the hereinbefore mentioned seventh part of the object of our said invention.

It is also obvious that when the potential of the supply circuit is such as to cause the rheostat contact arm to be moved against the stop 34, thereby engaging contact points 26 and 34 and thus close the gong circuit, the gong will sound an alarm, which, together with the position of the rheostat contact arm resting against stop 34, will accomplish the hereinbefore mentioned eighth part of the object of our said invention.

It is also obvious that should the connections of the terminals of the charging circuit at switches 43 and 44 be connected in a manner reverse to that of the normal, a reciprocating movement would be set up in the solenoid plunger, due to the voltage of the supply-circuit closing contact points 18 and 19, followed by their prompt reopening in response to the effect of the discharge current set to flowing through the auxiliary electro-magnet winding 16, upon the closing of points 18 and 19, and reducing the magnetic strength of the electro-magnet and thereby decreasing its pull on the solenoid plunger and allowing the force of the reacting spring operating through the vibrating contact lever, to open the contact made by points 18 and 19; this oscillation of the vibrating contact-lever would cause an intermittent ringing of the gong because of the engaging and disengaging of contact points 20 and 21 with each vibration of said lever, and indicating that the battery had not been properly connected, whereby the hereinbefore mentioned ninth part of the object of our said invention would be accomplished.

It is also obvious that when the vibrating contact-lever is about to disengage its contact with the rheostat contact-arm the contact points 21 and 33 will engage, thereby closing the gong circuit and cause the gong to ring; and that upon any further disengaging movement of the vibrating contact-lever taking place the contact points 20 and 21 will thereby become disengaged, whereupon the gong circuit being thereby opened, the gong will cease ringing; thereby accomplishing the hereinbefore mentioned tenth part of the object of our said invention.

By the opening of the switches 41 and 42 the hereinbefore severally described functions may be performed, except those of closing the distribution circuit on either the generator charging the battery, or on the battery being charged.

Having thus described the nature and objects of our said invention, what we claim as new, and desire to secure by Letters Patent, are:—

1. In an electric storage battery charging system the combination consisting of a storage battery provided with leads forming a charging circuit, and a rheostat provided with an arm carrying a contact for engaging said rheostat and inserted in said charging circuit, and leads forming a supply circuit and connected to the leads of said charging circuit, and a solenoid provided with a series and also a shunt winding said shunt winding being connected by means of its terminals across the terminals of the leads forming said supply circuit and said series winding being connected by means of its one terminal to the hereinafter mentioned contact lever-arm and by its other terminal to said storage battery and forming a part of the leads of said charging circuit, and a contact lever-arm having its one end engaged by the plunger of said solenoid and forming a part of the leads of said charging circuit and provided with a contact surface for engaging with a contact surface on said rheostat arm said contact lever-arm and said rheostat arm engaging each other through said contact surfaces; all substantially as and for the purpose shown and described.

2. In an electric storage battery charging system the combination consisting of a storage battery provided with leads forming a charging circuit, and a rheostat with an arm provided with an insulated extension said extension being provided with a contact to engage said rheostat said arm extension and said rheostat being a part of the field winding circuit of the generator which supplies current to the hereafter mentioned supply circuit and the pivoted part of said rheostat arm being a part of said battery charging circuit and provided with a contact point for engaging a fixed contact point forming the terminal of one of the leads of said charging circuit said contacts being in engagement so long as said rheostat arm reposes in its initial or normal position, and a solenoid provided with a series and also a shunt winding said shunt winding having its terminals connected across said supply circuit to the leads forming the terminals thereof and said series winding being connected by means of its one terminal to the hereinafter mentioned contact lever-arm and by its other terminal to said storage battery and forming a part of the leads of said charging circuit, and a contact lever-arm having its one end engaged by the plunger of said solenoid and forming a part of the leads of said charging circuit and provided with a contact surface for engaging with a contact surface on said rheostat arm said contact lever-arm and said rheostat arm engaging each other through said contact surfaces; all substantially as and for the purposes shown and described.

3. In an electric storage battery charging system the combination consisting of a storage battery provided with leads forming a charging circuit, and a rheostat provided with an arm carrying a contact for engaging said rheostat and inserted in said charging circuit, and leads forming a supply circuit and connected to the leads of said charging circuit, and a solenoid provided with a series and also a shunt winding said shunt winding being connected by means of its terminals across the terminals of the leads forming said supply circuit and said series winding being connected by means of its one terminal to the hereinafter mentioned contact lever-arm and by its other terminal to said storage battery and forming a part of the leads of said charging circuit, and a contact lever-arm having its one end engaged by the plunger of said solenoid and forming a part of the leads of said charging circuit and provided with a contact surface for engaging with a contact surface on said rheostat arm said contact lever-arm and said rheostat arm engaging each other through said contact surfaces, and an auxiliary rheostat engaging a contact point carried on an insulated extension provided to the arm of the aforesaid principal rheostat said auxiliary rheostat and said insulated arm extension being electrically connected in series with and forming part of said supply circuit generator field winding circuit; all substantially as and for the purposes shown and described.

4. In an electric current distribution system the combination consisting of a storage battery provided with leads forming a charging circuit, and a rheostat provided with an arm carrying a contact for engaging said rheostat and inserted in said charging circuit, and leads forming a supply circuit and connected to the leads of said charging circuit, and a solenoid provided with a series and also a shunt winding said shunt winding being connected by means of its terminals across the terminals of the leads forming said supply circuit and said series winding being connected by means of its one terminal to the hereinafter mentioned contact lever-arm and by its other terminal to said storage battery and forming a part of the leads of said charging circuit, and a contact lever-arm having its one end engaged by the plunger of said solenoid and forming a part of the leads of said charging circuit and provided with a contact surface for engaging with a contact surface on said rheostat arm said contact lever-arm and said rheostat arm engaging each other through said contact surfaces, and an auxiliary rheostat engaging a contact point carried on an insulated extension provided to the arm of the aforesaid principal rheostat said auxiliary rheostat and said insulated arm extension being electrically connected in series with and forming part of said supply circuit generator field winding circuit, and leads forming a distribution circuit fed by said supply circuit generator the terminals of said leads being connected the one with that of one polarity of said storage battery and said generator and the other to that of the opposite polarity of said generator through said charging circuit rheostat and its arm; all substantially as and for the purposes shown and described.

5. In an electric current distribution system the combination consisting of a storage battery provided with leads forming a charging circuit, and a rheostat provided with an arm carrying a contact for engaging said rheostat and inserted in said charging circuit, and leads forming a supply circuit and connected to the leads of said charging circuit, and a solenoid provided with a series and also a shunt winding said shunt winding being connected by means of its terminals across the terminals of the leads forming said supply circuit and said series winding being connected by means of its one terminal to the hereinafter mentioned contact lever-arm and by its other terminal to said storage battery and forming a part of the leads of said charging circuit, and a contact lever-arm having its one end engaged by the plunger of said solenoid and forming a part of the leads of said charging circuit and provided with a contact surface for engaging with a contact surface on said rheostat arm said contact lever-arm and said rheostat arm engaging each other through said contact surfaces, and an auxiliary rheostat engaging a contact point carried on an insulated extension provided to the arm of the aforesaid principal rheostat said auxiliary rheostat and said insulated arm extension being electrically connected in series with and forming part of said supply circuit generator field winding circuit, and leads forming a distribution circuit fed by said storage battery the terminals of said leads being connected the one to similar polarity connections of said storage battery and of said generator the other to said charging circuit rheostat arm said arm being provided with a contact point for engaging with a fixed contact point connected to the opposite polarity lead of said storage battery; all substantially as and for the purposes shown and described.

6. In a system of electric current and voltage regulation of the character hereinbefore described, an electrically operated gong provided with leads forming its operating circuit, the one lead of which being connected to one of the leads of the supply circuit of said system and the other of its said leads being connected to two contacts the one for engaging with a contact located on the arm of a rheostat said arm forming part of the leads of the circuits embraced in said system and the other for engaging with a contact also located on said rheostat arm but insulated therefrom, said contacts and said rheostat arm being part of said gong operating circuit; all substantially as and for the purposes shown and described.

7. In a system of electric current and voltage control, apparatus consisting of a solenoid provided with a main and an auxiliary electro-magnet winding; and a vibrating contact-lever operated by said solenoid through direct mechanical engagement of the same with the plunger of said solenoid; in combination with an electric current generator, and leads for electrically connecting the same in circuit with said solenoid and with said vibrating contact-lever; and a shunt circuit provided with an auxiliary field rheostat electrically connected to said generator the arm of said rheostat being actuated from its contact position of no or lesser resistance to higher resistance contacts by the engagement therewith of said vibrating contact lever; all substantially as and for the purposes shown and described.

In testimony whereof we have signed our respective names to this specification in the presence of two subscribing witnesses.

DAVID R. KNAPP.
HOWARD E. CADE.

Witnesses:
ROBT. D. KINNEY,
JAS. F. SMYTH.